United States Patent
Kim et al.

(10) Patent No.: US 11,916,238 B2
(45) Date of Patent: Feb. 27, 2024

(54) ELECTRODE AND METHOD FOR MANUFACTURING THE SAME

(71) Applicant: LG Energy Solution, Ltd., Seoul (KR)

(72) Inventors: Il-Hong Kim, Daejeon (KR); O-Jong Kwon, Daejeon (KR); Hee-Chang Youn, Daejeon (KR); Yo-Han Kwon, Daejeon (KR); Min-Chul Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/033,555

(22) PCT Filed: Mar. 10, 2022

(86) PCT No.: PCT/KR2022/003385
§ 371 (c)(1),
(2) Date: Apr. 25, 2023

(87) PCT Pub. No.: WO2022/191645
PCT Pub. Date: Sep. 15, 2022

(65) Prior Publication Data
US 2024/0021830 A1 Jan. 18, 2024

(30) Foreign Application Priority Data
Mar. 12, 2021 (KR) .......................... 10-2021-0032998

(51) Int. Cl.
| | | |
|---|---|---|
| H01M 4/62 | (2006.01) |
| H01M 4/02 | (2006.01) |
| H01M 4/04 | (2006.01) |
| H01M 4/131 | (2010.01) |
| H01M 4/58 | (2010.01) |
| H01M 10/052 | (2010.01) |

(52) U.S. Cl.
CPC ......... *H01M 4/623* (2013.01); *H01M 4/0404* (2013.01); *H01M 4/0471* (2013.01); *H01M 4/131* (2013.01); *H01M 4/5825* (2013.01); *H01M 10/052* (2013.01); *H01M 2004/021* (2013.01)

(58) Field of Classification Search
None
See application file for complete search history.

(56) References Cited

U.S. PATENT DOCUMENTS

| | | | |
|---|---|---|---|
| 2006/0115730 A1 | 6/2006 | Taniguchi et al. | |
| 2016/0218348 A1 | 7/2016 | Son et al. | |
| 2016/0308214 A1 | 10/2016 | Umeyama et al. | |
| 2018/0315969 A1* | 11/2018 | Sung | H01M 50/457 |
| 2020/0295360 A1 | 9/2020 | Bae et al. | |
| 2020/0295405 A1 | 9/2020 | Komori et al. | |
| 2020/0395603 A1 | 12/2020 | Min et al. | |
| 2021/0119200 A1 | 4/2021 | Nam | |
| 2021/0399336 A1* | 12/2021 | Kim | H01M 10/0525 |
| 2021/0408548 A1 | 12/2021 | Park et al. | |
| 2022/0158194 A1* | 5/2022 | Kim | H01M 4/525 |
| 2022/0234151 A1* | 7/2022 | Ren | F16J 15/3284 |
| 2022/0367875 A1* | 11/2022 | Motoki | H01M 4/622 |
| 2022/0384812 A1* | 12/2022 | Woo | C08L 15/00 |
| 2022/0407076 A1* | 12/2022 | Motoki | H01M 4/622 |
| 2022/0407151 A1* | 12/2022 | Pele | H01M 50/229 |
| 2023/0060872 A1* | 3/2023 | Delaporte | H01M 4/628 |
| 2023/0335745 A1* | 10/2023 | Lee | H01M 10/058 |
| 2023/0339775 A1* | 10/2023 | Iida | C01G 53/00 |

FOREIGN PATENT DOCUMENTS

| | | |
|---|---|---|
| JP | 4797851 B2 | 10/2011 |
| JP | 2015-153658 A | 8/2015 |
| JP | 2016-201338 A | 12/2016 |
| JP | 2017-69195 A | 4/2017 |
| KR | 10-2006-0060609 A | 6/2006 |
| KR | 10-2016-0092742 A | 8/2016 |
| KR | 10-2019-0064480 A | 6/2019 |
| KR | 10-2020-0065624 A | 6/2020 |
| KR | 10-2020-0109764 A | 9/2020 |
| KR | 10-2020-0142340 A | 12/2020 |
| WO | 2016/114474 A1 | 7/2016 |

OTHER PUBLICATIONS

International Search Report (with translation) and Written Opinion dated Jun. 15, 2022, for corresponding International Patent Application No. PCT/KR2022/003385.
Verdier et al., "Polyacrylonitrile-based rubber (HNBR) as a new potential elastomeric binder for lithium-ion battery electrodes", Journal of Power Sources, vol. 440, 2019, pp. 1-9.

* cited by examiner

*Primary Examiner* — Scott J. Chmielecki
(74) *Attorney, Agent, or Firm* — Morgan, Lewis & Bockius LLP

(57) ABSTRACT

An electrode including a current collector; and an electrode active material layer disposed on at least one surface of the current collector is disclosed. The electrode active material layer includes a lower layer region facing the current collector, and an upper layer region facing the lower layer region and extended to the surface of the electrode active material layer. The lower layer region includes a first active material and a first non-rubbery binder and is free from a rubbery binder. The upper layer region includes a second active material, a second non-rubbery binder, and a rubbery binder. The rubbery binder is a hydrogenated nitrile butadiene rubber (H-NBR). Each of the first non-rubbery binder and the second non-rubbery binder includes a polyvinylidene fluoride (PVDF)-based polymer, and the weight ratio of the second non-rubbery binder to the rubbery binder in the upper layer region is 1:0.03-1:0.07.

13 Claims, No Drawings

ELECTRODE AND METHOD FOR MANUFACTURING THE SAME

TECHNICAL FIELD

The present disclosure relates to an electrode having enhanced flexibility and a method for manufacturing the same.

CROSS-REFERENCE TO RELATED APPLICATION

The present application claims priority to Korean Patent Application No. 10-2021-0032998 filed on Mar. 12, 2021 in the Republic of Korea, the disclosure of which is incorporated herein by reference.

BACKGROUND ART

As technical development and needs for mobile instruments have been increased, secondary batteries that are rechargeable and can be downsized and provided with high capacity have been increasingly in demand. In addition, among such secondary batteries, lithium secondary batteries having high energy density and operating voltage have been commercialized and used widely.

A lithium secondary battery has a structure including an electrode assembly having a positive electrode and a negative electrode, each of which includes an active material coated on an electrode current collector, and a porous separator interposed between both electrodes; and a lithium salt-containing electrolyte injected to the electrode assembly. The electrode is obtained by applying a slurry including an active material, a binder and a conductive material dispersed in a solvent to a current collector, followed by drying and pressing.

In general, a secondary battery includes a positive electrode, a negative electrode, an electrolyte and a separator. The electrode, such as the positive electrode or the negative electrode, is obtained by forming an electrode active material layer including an electrode active material on at least one surface of a current collector. Herein, there has been an attempt to apply an active material having a small particle diameter, for example, a particle diameter of several hundreds of nanometers to several micrometers, when preparing the active material in order to ensure the performance of the electrode active material.

However, in the case of an electrode active material having an excessively small particle diameter, there has been a problem in that it shows low adhesion to the current collector (e.g. metal foil). To solve this, there have been suggested a method of coating the electrode active material on a current collector coated with a thin coating layer containing a binder and a conductive material, or a method for manufacturing an electrode having a low weight due to a difficulty in providing an electrode with a high weight per unit area.

In addition, recently, novel products, such as wearable devices, different from the existing products have been launched due to rapid technical development and user's need in the digital industry.

Such wearable devices include various types of products, such as eyeglasses, watches/bracelets, shoes/soles, rings, waist belts, arm bands, necklaces, ear sets, clothes, badges, or the like, depending on where the device is worn. It is required for a battery applicable to such wearable devices to have flexibility so that it may not be deformed after repeated bending. Particularly, the electrode applied to such a battery is required to have excellent flexibility. To improve the flexibility of such an electrode, there has been an attempt to add a soft material as a binder forming the electrode active material layer. However, in this case, there are problems in that the solid content of a slurry for forming an electrode active material layer is reduced to cause degradation of coating productivity, or an undesirably large amount of soft material is added to cause an increase in electrode thickness, resulting in a decrease in energy density.

DISCLOSURE

Technical Problem

The present disclosure is designed to solve the problems of the related art, and therefore the present disclosure is directed to providing an electrode showing improved adhesion between a current collector and an electrode active material layer and having enhanced flexibility, and a method for manufacturing the same.

The present disclosure is also directed to providing a lithium secondary battery including the electrode.

Technical Solution

In one aspect of the present disclosure, there is provided an electrode according to any one of the following embodiments.

According to the first embodiment, there is provided an electrode including:
  a current collector; and
  an electrode active material layer disposed on at least one surface of the current collector,
  wherein the electrode active material layer includes a lower layer region facing the current collector, and an upper layer region facing the lower layer region and extended to the surface of the electrode active material layer,
  the lower layer region includes a first active material and a first non-rubbery binder and is free from a rubbery binder,
  the upper layer region includes a second active material, a second non-rubbery binder and a rubbery binder,
  the rubbery binder is a hydrogenated nitrile butadiene rubber (H-NBR),
  each of the first non-rubbery binder and the second non-rubbery binder includes a polyvinylidene fluoride (PVDF)-based polymer, and
  the weight ratio of the second non-rubbery binder to the rubbery binder in the upper layer region is 1:0.03 to 1:0.07.

According to the second embodiment, there is provided the electrode as defined in the first embodiment, wherein the weight ratio of the lower layer region to the upper layer region is 1:1 to 1:5.

According to the third embodiment, there is provided the electrode as defined in the first or the second embodiment, which is a positive electrode, wherein each of the first active material and the second active material includes a lithium iron phosphate (LFP) compound.

According to the fourth embodiment, there is provided the electrode as defined in the third embodiment, wherein the lithium iron phosphate (LFP) compound has an average particle diameter (D50) of 0.8 μm to 2.5 μm.

According to the fifth embodiment, there is provided the electrode as defined in any one of the first to the fourth embodiments, wherein the polyvinylidene fluoride (PVDF)-based polymer includes polyvinylidene fluoride, polyvinylidene fluoride-co-hexafluoropropylene, polyvinylidene fluoride-co-chlorotrifluoroethylene, polyvinylidene fluoride-co-tetrafluoroethylene, polyvinylidene fluoride-co-trichloroethylene, polyvinylidene fluoride-co-trifluoroethylene, or two or more of them.

According to the sixth embodiment, there is provided the electrode as defined in any one of the first to the fifth embodiments, wherein the weight ratio of the second non-rubbery binder to the rubbery binder in the upper layer region is 1:0.04 to 1:0.06.

According to the seventh embodiment, there is provided a method for manufacturing the electrode as defined in the first embodiment, including the steps of:
  preparing a slurry for a lower layer including a first active material, a first non-rubbery binder and a first dispersion medium and free from a rubbery binder, and a slurry for an upper layer including a second active material, a second non-rubbery binder, a rubbery binder and a second dispersion medium;
  coating the slurry for a lower layer on one surface of an electrode current collector, and coating the slurry for an upper layer on the slurry for a lower layer, at the same time or with a predetermined time interval; and
  drying the coated slurry for a lower layer and slurry for an upper layer at the same time to form an active material layer,
  wherein the rubbery binder is a hydrogenated nitrile butadiene rubber (H-NBR), each of the first non-rubbery binder and the second non-rubbery binder includes a polyvinylidene fluoride (PVDF)-based polymer, and the weight ratio of the second non-rubbery binder to the rubbery binder in the slurry for an upper layer is 1:0.03 to 1:0.07.

According to the eighth embodiment, there is provided a method for manufacturing the electrode as defined in the first embodiment, including the steps of:
  coating a slurry for a lower layer including a first active material, a first non-rubbery binder and a first dispersion medium and free from a rubbery binder on one surface of an electrode current collector, followed by drying, to form a lower active material layer; and
  coating a slurry for an upper layer including a second active material, a second non-rubbery binder, a rubbery binder and a second dispersion medium on the top surface of the lower active material layer, followed by drying, to form an upper active material layer,
  wherein the rubbery binder is a hydrogenated nitrile butadiene rubber (H-NBR), each of the first non-rubbery binder and the second non-rubbery binder includes a polyvinylidene fluoride (PVDF)-based polymer, and the weight ratio of the second non-rubbery binder to the rubbery binder in the slurry for an upper layer is 1:0.03 to 1:0.07.

According to the ninth embodiment, there is provided the method for manufacturing the electrode as defined in the seventh or the eighth embodiment, wherein the electrode is a positive electrode, and each of the first active material and the second active material includes a lithium iron phosphate (LFP) compound.

According to the tenth embodiment, there is provided the method for manufacturing the electrode as defined in the ninth embodiment, wherein the lithium iron phosphate (LFP) compound has an average particle diameter (D50) of 0.8 μm to 2.5 μm.

According to the eleventh embodiment, there is provided a lithium secondary battery including the electrode as defined in any one of the first to the sixth embodiments as at least one of a positive electrode and a negative electrode.

Advantageous Effects

According to an embodiment of the present disclosure, a hydrogenated nitrile butadiene rubber which has high wettability with an electrode to allow swelling sufficiently is used as a binder for an electrode active material layer. In this manner, it is possible to enhance the flexibility of an electrode and to supplement the disadvantage of degradation of the adhesion of an active material layer to a current collector, caused by an increase in content of hydrogenated nitrile butadiene rubber. In other words, according to an embodiment of the present disclosure, the electrode has a dual layer structure, wherein a hydrogenated nitrile butadiene rubber is introduced as an additional binder merely to the upper layer region of the dual layer structure. Therefore, the amount of hydrogenated nitrile butadiene rubber used in the electrode is reduced, and thus it is possible to improve the flexibility of the electrode, while maintaining the adhesion between the electrode layer and the current collector.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In one aspect of the present disclosure, there is provided an electrode including:
  a current collector; and
  an electrode active material layer disposed on at least one surface of the current collector,
  wherein the electrode active material layer includes a lower layer region facing the current collector, and an upper layer region facing the lower layer region and extended to the surface of the electrode active material layer,
  the lower layer region includes a first active material and a first non-rubbery binder and is free from a rubbery binder,
  the upper layer region includes a second active material, a second non-rubbery binder and a rubbery binder,
  the rubbery binder is a hydrogenated nitrile butadiene rubber (H-NBR),
  each of the first non-rubbery binder and the second non-rubbery binder includes a polyvinylidene fluoride (PVDF)-based polymer, and
  the weight ratio of the second non-rubbery binder to the rubbery binder in the upper layer region is 1:0.03 to 1:0.07.

The electrode may be a positive electrode or a negative electrode.

When the electrode is a positive electrode, each of the first active material and the second active material may include any one active material particle selected from the group consisting of $LiCoO_2$, $LiNiO_2$, $LiMn_2O_4$, $LiCoPO_4$, $LiFePO_4$ and $LiNi_{1-x-y-z}Co_xM1_yM2_zO_2$ (wherein each of M1 and M2 independently represents any one selected from the group consisting of Al, Ni, Co, Fe, Mn, V, Cr, Ti, W, Ta, Mg and Mo, each of x, y and z independently represents the atomic ratio of an element forming oxide, and 0≤x<0.5, 0≤y<0.5, 0≤z<0.5, and 0<x+y+z≤1), or a mixture of at least two of them.

According to an embodiment of the present disclosure, the electrode may be a positive electrode, and each of the first active material and the second active material may include a lithium iron phosphate (LFP) compound.

The lithium iron phosphate (LFP) compound may have an average particle diameter (D50) of 0.8 µm to 2.5 µm, 0.8 µm to 1.2 µm, or 1.8 µm to 2.5 µm.

Herein, the term 'average particle diameter, D50' means a particle diameter at a point of 50% in the accumulated particle number distribution depending on particle diameter. The particle diameter, D50, may be determined by using a laser diffraction method. Particularly, a powder to be analyzed is dispersed in a dispersion medium and introduced to a commercially available laser diffraction particle size analyzer (e.g. Microtrac S3500), and then a difference in diffraction pattern depending on particle size is determined, when particles pass through laser beams, and then particle size distribution is calculated. Then, the particle diameter at a point of 50% of the particle number accumulated distribution depending on particle diameter is calculated to determine D50.

According to an embodiment of the present disclosure, the electrode may be a negative electrode, and each of the first active material and the second active material may independently include a carbonaceous material, a silicon-based material (e.g. silicon oxide represented by $SiO_x$ (0<x<2)), Si, $Li_xFe_2O_3$ (0≤x≤1), $Li_xWO_2$ (0≤x≤1), metal composite oxides, such as $Sn_xMe_{1-x}Me'_yO_z$ (Me: Mn, Fe, Pb, Ge; Me': Al, B, P, Si, elements of Group 1, 2 or 3 in the Periodic Table, halogen; 0<x≤1; 1≤y≤3; 1≤z≤8), lithium metal, lithium alloy, silicon-based alloy, tin-based alloy, metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, conductive polymers, such as polyacetylene, Li—Co—Ni type materials, titanium oxide, lithium titanium oxide, or the like.

The carbonaceous material may be at least one selected from the group consisting of natural graphite, artificial graphite, amorphous hard carbon, low crystalline soft carbon, carbon black, acetylene black, ketjen black, Super P, graphene and fibrous carbon.

In the electrode according to the present disclosure, when the first active material contained in the lower layer region and the second active material contained in the upper layer region are different from each other in terms of average particle diameter and shape, an intermixing region in which such different types of active materials are mixed may be present at the portion where the lower layer region is in contact with the upper layer region. This is because when the slurry for a lower layer containing the first active material and the slurry for an upper layer containing the second active material are coated at the same time or continuously with a very short time interval, and then dried at the same time to form an electrode active material layer, a certain intermixing zone is generated at the interface where the slurry for a lower layer is in contact with the slurry for an upper layer before drying, and then the intermixing zone is formed in the shape of a layer of intermixing region, while the slurry for a lower layer and the slurry for an upper layer are dried subsequently.

According to an embodiment of the present disclosure, the first active material of the lower layer region of the active material layer and the second active material of the upper layer region of the active material layer may be the same or different in terms of physical properties, such as average particle diameter and tap density.

According to an embodiment of the present disclosure, the weight ratio of the first active material of the lower layer region of the active material layer to the second active material of the upper layer region of the active material layer may be 1:1 to 1:5, or 1:2 to 1:3. When the above-defined weight ratio is satisfied, a larger amount of hydrogenated nitrile butadiene rubber (H-NBR) may be incorporated to the upper layer region, and thus the electrode may have improved flexibility. In other words, if the total thickness of the electrode is the same, a larger amount of rubber may be incorporated at a higher weight proportion of the upper layer as compared to 1:1.

According to an embodiment of the present disclosure, the thickness ratio of the upper layer region to the lower layer region may be 1:1 to 5:1, or 2:1 to 3:1.

According to an embodiment of the present disclosure, the total thickness of the electrode active material layer is not particularly limited. For example, the electrode active material layer may have a total thickness of 40 µm to 200 µm. In addition, in the active material layer, the lower layer region may have a thickness of 20 µm to 98 µm, or 7 µm to 35 µm, and the upper layer region may have a thickness of 102 µm to 180 µm, or 33 µm to 165 µm.

Herein, when the thickness ratio of the upper layer region to the lower layer region satisfies the above-defined range, a larger amount of hydrogenated nitrile butadiene rubber (H-NBR) may be incorporated to the upper layer region, and thus the electrode may have improved flexibility. Such a thickness ratio may be calculated based on the weight ratio.

In the active material layer of the electrode according to the present disclosure, the weight ratio (or ratio of loading amount per unit area) of the lower layer region to the upper layer region may be 1:1 to 1:5, or 1:2 to 1:3.

Herein, when the weight ratio of the lower layer region to the upper layer region satisfies the above-defined range, a larger amount of hydrogenated nitrile butadiene rubber (H-NBR) may be incorporated to the upper layer region, and thus the electrode may have improved flexibility.

In the upper layer region, the weight ratio of the second non-rubbery binder to the rubbery binder is 1:0.03 to 1:0.07. According to an embodiment of the present disclosure, the weight ratio of the second non-rubbery binder to the rubbery binder in the upper layer region may be 1:0.04 to 1:0.06.

When the weight ratio of the second non-rubbery binder to the rubbery binder in the upper layer region is less than 1:0.03, i.e. when the proportion of the content of the rubbery binder is decreased further, it is not possible to obtain an effect of improving the flexibility of the electrode. When the weight ratio of the second non-rubbery binder to the rubbery binder in the upper layer region is larger than 1:0.07, i.e. when the content of the rubber binder is increased further, it is not possible to apply a slurry homogeneously onto the current collector due to the high viscosity of the slurry, and thus it is not possible to manufacture the electrode itself.

The weight ratio of the non-rubbery binder to the rubbery binder in the finished battery may be determined through spectrometry. For example, the electrode may be analyzed by IR, and the intensity of detection of one binder may be compared with that of another binder.

The rubbery binder is a hydrogenated nitrile butadiene rubber (H-NBR). The hydrogenated nitrile butadiene rubber includes a repeating unit having an α,β-unsaturated nitrile-derived structure and a repeating unit having a hydrogenated conjugated diene-derived structure.

Particularly, the hydrogenated nitrile butadiene rubber may be prepared by copolymerizing an α,β-unsaturated nitrile and a conjugated diene optionally with another copolymerizable copolymer, and hydrogenating the C=C double bonds in the resultant copolymer. Herein, the polymerization and hydrogenation processes may be carried out in the conventional manner.

Particular examples of the α,β-unsaturated nitrile include acrylonitrile or methacrylonitrile, and any one of them may be used alone, or a mixture of two or more of them may be used.

Particular examples of the conjugated diene include a C4-C6 conjugated diene, such as 1,3-butadiene, isoprene or 2,3-methylbutadiene, and any one of them may be used alone, or a mixture of two or more of them may be used.

Particular examples of the optionally used copolymerizable copolymer include, but are not limited to: an aromatic vinyl monomer (e.g. styrene, (t-methylstyrene, vinylpyridine, fluoroethyl vinyl ether, or the like), α,β-unsaturated carboxylic acid (e.g. acrylic acid, methacrylic acid, maleic acid, fumaric acid, or the like), ester or amide of α,β-unsaturated carboxylic acid (e.g. methyl (meth)acrylate, ethyl (meth)acrylate, n-dodecyl (meth)acrylate, methoxymethyl (meth)acrylate, hydroxyethyl (meth)acrylate, polyethylene glycol (meth)acrylate, or the like), and anhydride of α,β-unsaturated dicarboxylic acid (e.g. maleic anhydride, itaconic anhydride, citraconic anhydride, or the like).

In the hydrogenated nitrile butadiene rubber obtained by the above-mentioned method, the weight ratio of the repeating unit having an α,β-unsaturated nitrile-derived structure, the repeating unit having a conjugated diene-derived structure, the repeating unit having a hydrogenated conjugated diene-derived structure and the structure having an optionally used copolymerizable comonomer-derived structure may vary within a broad range, with the proviso that the sum of the above-mentioned repeating units is 100 wt %.

The content of the repeating unit having an α,β-unsaturated nitrile-derived structure in the hydrogenated nitrile butadiene rubber may be 20-50 wt %, particularly 20-30 wt %, based on the total weight of the hydrogenated nitrile butadiene rubber.

The content of the repeating unit having an α,β-unsaturated nitrile-derived structure in the hydrogenated nitrile butadiene rubber is a weight ratio of the repeating unit having an α,β-unsaturated nitrile-derived structure based on the total weight of the hydrogenated nitrile butadiene rubber, and may be as a mean value of the values determined by measuring the amount of nitrogen generated and expressing the binding content thereof from the molecular weight of acrylonitrile according to the mill oven method as defined in JIS K 6364.

The hydrogenated nitrile butadiene rubber may include the repeating unit having a hydrogenated conjugated diene-derived structure in an amount of 20-70 wt %, particularly 20-50 wt %, and more particularly 30-50 wt %, based on the total weight of the hydrogenated nitrile butadiene rubber. When the content of the repeating unit having a hydrogenated conjugated diene-derived structure satisfies the above-defined range, the active material may have increased dispersibility through an increase in miscibility with the dispersion medium.

The hydrogenated nitrile butadiene rubber may have a weight average molecular weight of 10,000-700,000 g/mol, particularly 10,000-200,000 g/mol. In addition, the hydrogenated nitrile butadiene rubber may have a polydispersity index (PDI) (ratio of Mw/Mx, wherein Mw is a weight average molecular weight, and Mn is a number average molecular weight) of 2.0-6.0, particularly 2.0-4.0.

According to the present disclosure, each of the weight average molecular weight and the number average molecular weight is a molecular weight analyzed by gel permeation chromatography (GPC) based on polystyrene as standard.

The weight percentage (wt %) of the first non-rubbery binder in the lower layer region may be the same as or may be larger than the total weight percentage (wt %) of the second non-rubbery binder and the rubbery binder in the upper layer region.

Particularly, the weight percentage (wt %) of the first non-rubbery binder in the lower layer region may be 1-3 times, or 1.5-2 times of the total weight percentage (wt %) of the second non-rubbery binder and the rubbery binder in the upper layer region.

Herein, when the weight percentage of the first binder in the lower layer region and the weight percentage of the second binder in the upper layer region satisfy the above-defined range, it is possible to improve the adhesion between the active material layer and the current collector.

According to an embodiment of the present disclosure, the ratio (wt %) of the first non-rubbery binder in the lower layer of the electrode active material layer may be 2-4 wt %, or 2.5-3.5 wt %, and the total weight percentage (wt %) of the second non-rubbery binder and the rubbery binder in the upper layer of the electrode active material layer may be 0.5-2 wt %, or 1.2-1.8 wt %.

According to an embodiment of the present disclosure, the total weight percentage (wt %) of the first non-rubbery binder, the second non-rubbery binder and the rubbery binder may be 1-4 wt %, or 2.5-3.5 wt %, based on the total weight of the electrode active material layer.

According to an embodiment of the present disclosure, the electrode current collector used as a substrate for forming the active material layer is not particularly limited, as long as it has conductivity, while not causing any chemical change in the corresponding battery. For example, copper, stainless steel, aluminum, nickel, titanium, baked carbon, copper or stainless steel surface-treated with carbon, nickel, titanium, silver, etc., aluminum-cadmium alloy, or the like, may be used.

Although the current collector is not particularly limited in its thickness, it may have a currently used thickness of 3-500 μm.

Each of the first non-rubbery binder and the second non-rubbery binder includes a polyvinylidene fluoride (PVDF)-based polymer.

The polyvinylidene fluoride (PVDF)-based polymer may include polyvinylidene fluoride, polyvinylidene fluoride-co-hexafluoropropylene, polyvinylidene fluoride-co-chlorotrifluoroethylene, polyvinylidene fluoride-co-tetrafluoroethylene, polyvinylidene fluoride-co-trichloroethylene, polyvinylidene fluoride-co-trifluoroethylene, or two or more of them.

Each of the first non-rubbery binder and the second non-rubbery binder contained in the lower layer region and the upper layer region may independently include one or more of the above-mentioned polyvinylidene fluoride (PVDF)-based polymer.

Besides the polyvinylidene fluoride (PVDF)-based polymer, each of the first non-rubbery binder and the second non-rubbery binder may independently further include a polymer, such as polyacrylonitrile, polymethyl methacrylate, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, polyacrylic acid, or the like.

In addition, a part of the first non-rubbery binder and the second non-rubbery binder may function as a thickener capable of increasing the viscosity of a slurry for an active material layer to improve the dispersibility of the active material. For example, carboxymethyl cellulose (CMC), carboxyethyl cellulose, polyvinyl pyrrolidone, or the like, may function as a thickener.

Optionally, at least one of the lower layer region and the upper layer region may further include a conductive material. The conductive material is not particularly limited, as long as it has conductivity, while causing no chemical change in the corresponding battery. Particular examples of the conductive material include: carbon black, such as acetylene black, Ketjen black, channel black, furnace black, lamp black or thermal black; conductive fibers, such as carbon fibers or metallic fibers; fluorocarbon; metal powder, such as aluminum or nickel powder; conductive whisker, such as zinc oxide or potassium titanate; conductive metal oxide, such as titanium oxide; and conductive materials, such as polyphenylene derivatives.

In another aspect of the present disclosure, there is provided a method for manufacturing the electrode as described above, including the steps of:
  preparing a slurry for a lower layer including a first active material, a first non-rubbery binder and a first dispersion medium and free from a rubbery binder, and a slurry for an upper layer including a second active material, a second non-rubbery binder, a rubbery binder and a second dispersion medium;
  coating the slurry for a lower layer on one surface of an electrode current collector, and coating the slurry for an upper layer on the slurry for a lower layer, at the same time or with a predetermined time interval; and
  drying the coated slurry for a lower layer and slurry for an upper layer at the same time to form an active material layer,
  wherein the rubbery binder is a hydrogenated nitrile butadiene rubber (H-NBR), each of the first non-rubbery binder and the second non-rubbery binder includes a polyvinylidene fluoride (PVDF)-based polymer, and the weight ratio of the second non-rubbery binder to the rubbery binder in the slurry for an upper layer is 1:0.03-1:0.07.

The first active material, the second active material, the first non-rubbery binder, the second non-rubbery binder and the rubbery binder contained in the slurry for a lower layer and the slurry for an upper layer are the same as described above.

Each of the first dispersion medium and the second dispersion medium may independently include N-methyl pyrrolidone, acetone, water, or the like.

Herein, the lower layer region of the electrode active material layer according to the present disclosure is formed from the coated slurry for a lower layer, and the upper layer region of the electrode active material layer according to the present disclosure is formed from the coated slurry for an upper layer.

In the active material layer of the electrode according to the present disclosure, the thickness of each of the lower layer region and the upper layer region may not be perfectly the same as the thickness of each of the coated slurry for a lower layer and the coated slurry for an upper layer. However, after carrying out a drying process or an optional pressing process, the thickness ratio of the lower layer region to the upper layer region of the active material layer in the finished electrode according to the present disclosure may be the same as the thickness ratio of the coated slurry for a lower layer to the coated slurry for an upper layer.

According to an embodiment of the present disclosure, the slurry for a lower layer may be coated, and the slurry for an upper layer may be coated on the slurry for a lower layer at the same time or with a predetermined interval, by using a device, such as a double slot die.

The step of drying the coated slurry for a lower layer and slurry for an upper layer at the same time to form an active material layer may be carried out by using an oven including several zones, while controlling the temperature and air flow condition.

Next, the coated first slurry and second slurry are dried at the same time by using a drying device provided with a hot air dryer and an infrared ray (IR) heater to form an active material layer.

According to an embodiment of the present disclosure, the drying device may include: a drying chamber through which an electrode sheet having a current collector and an electrode active material slurry coated on the current collector is passed; a stage disposed on the bottom surface of the electrode sheet to move the electrode sheet in the longitudinal direction and in the transverse direction in the drying chamber; a hot air blower configured to supply hot air to the electrode sheet to apply convection heat thereto; and an infrared ray (IR) dryer configured to apply radiation heat to the electrode sheet.

In the step of forming an active material layer, the method may further include a step of pressing the active material layer after the drying step. Herein, the roll pressing may be carried out under a pressure of 1-20 MPa at a temperature of 15-30° C.

In still another aspect of the present disclosure, there is provided a method for manufacturing the electrode as described above, including the steps of:
  coating a slurry for a lower layer including a first active material, a first non-rubbery binder and a first dispersion medium and free from a rubbery binder on one surface of an electrode current collector, followed by drying, to form a lower active material layer; and
  coating a slurry for an upper layer including a second active material, a second non-rubbery binder, a rubbery binder and a second dispersion medium on the top surface of the lower active material layer, followed by drying, to form an upper active material layer,
  wherein the rubbery binder is a hydrogenated nitrile butadiene rubber (H-NBR), each of the first non-rubbery binder and the second non-rubbery binder includes a polyvinylidene fluoride (PVDF)-based polymer, and the weight ratio of the second non-rubbery binder to the rubbery binder in the slurry for an upper layer is 1:0.03-1:0.07.

Unlike the method including coating the slurry for a lower layer and slurry for an upper layer at the same time or with a predetermined time interval and drying the coated slurry for a lower layer and slurry for an upper layer at the same time, the above method includes coating and drying a slurry for a lower layer to form a lower active material layer, and then coating and drying a slurry for an upper layer on the lower layer of active material layer. Then, a pressing step may be carried out.

Herein, reference will be made the above description about the coating, drying and pressing steps.

According to the present disclosure, the thickness ratio of the coated slurry for a lower layer to the coated slurry for an upper layer may be 1:1 to 1:5, or 1:2 to 1:3.

Herein, the thickness of the coated slurry for a lower layer and that of the coated slurry for an upper layer may be controlled by using a double slot die.

According to an embodiment of the present disclosure, the coated slurry for a lower layer may have a thickness of 20-98 µm, or 7-35 µm, and the thickness of the coated slurry for an upper layer may be 102-180 µm, or 33-165 µm.

Herein, when the thickness ratio of the coated slurry for a lower layer to the coated slurry for an upper layer satisfies the above-defined range, a larger amount of hydrogenated nitrile butadiene rubber (H-NBR) may be incorporated to the upper layer region, and thus the electrode may have improved flexibility.

According to the present disclosure, the weight ratio of the solid content of the coated slurry for a lower layer to the solid content of the coated slurry for an upper layer may be 1:1 to 1:5, or 1:2 to 1:3.

Herein, when the weight ratio of the solid content of the coated slurry for a lower layer to the solid content of the coated slurry for an upper layer satisfies the above-defined range, a larger amount of hydrogenated nitrile butadiene rubber (H-NBR) may be incorporated to the upper layer region, and thus the electrode may have improved flexibility.

The weight percentage (wt %) of the first binder polymer in the solid content of the slurry for a lower layer may be the same as or may be larger than the weight percentage (wt %) of the second binder polymer in the solid content of the slurry for an upper layer. According to an embodiment of the present disclosure, the weight percentage (wt %) of the first binder polymer in the solid content of the slurry for a lower layer may be 1-3 times, or 1.5-2 times higher than the weight percentage (wt %) of the second binder polymer in the solid content of the slurry for an upper layer.

Herein, when the ratio of the weight percentage (wt %) of the first binder in the coated slurry for a lower layer to the weight percentage (wt %) of the second binder in the coated slurry for an upper layer satisfies the above-defined range, a larger amount of hydrogenated nitrile butadiene rubber (H-NBR) may be incorporated to the upper layer region, and thus the electrode may have improved flexibility.

The weight percentage (wt %) of the first binder polymer in the solid content of the slurry for a lower layer may be 2-4 wt %, or 1.5-3.5 wt %, and the weight percentage (wt %) of the second binder polymer in the solid content of the slurry for an upper layer may be 0.5-2 wt %, or 1.2-1.8 wt %.

The total content (wt %) of the first binder polymer and the second binder polymer in the total solid content of the slurry for a lower layer and the slurry for an upper layer may be 1-4 wt %, or 2.5-3.5 wt %.

In yet another aspect of the present disclosure, there is provided a lithium secondary battery including the above-described electrode as at least one of a positive electrode and a negative electrode.

When the lithium secondary battery according to an embodiment of the present disclosure includes the above-described electrode as only one of the positive electrode and the negative electrode, the other electrode, i.e. the positive electrode or the negative electrode, may be obtained by using conventional electrode materials, such as an active material, a binder, or the like.

In addition, the lithium secondary battery may be obtained by injecting a lithium salt-containing electrolyte to an electrode assembly including a positive electrode, a negative electrode, and a separator interposed between both electrodes.

Herein, the separator may be a conventional porous polymer film used conventionally as a separator. For example, the porous polymer film may be a porous polymer film made of a polyolefinic polymer, such as ethylene homopolymer, propylene homopolymer, ethylene-butene copolymer, ethylene/hexene copolymer or ethylene/methacrylate copolymer. Such a porous polymer film may be used alone or in the form of a laminate. In addition, an insulating thin film having high ion permeability and mechanical strength may be used. The separator may include a safety reinforced separator (SRS) including a ceramic material coated on the surface of the separator to a small thickness. In addition, a conventional porous non-woven web, such as non-woven web made of high-melting point glass fibers or polyethylene terephthalate fibers, may be used, but the scope of the present disclosure is not limited thereto.

The electrolyte includes a lithium salt as an electrolyte salt and an organic solvent for dissolving the lithium salt.

Any lithium salt used conventionally for an electrolyte for a secondary battery may be used with no particular limitation. For example, the anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The organic solvent contained in the electrolyte may be any organic solvent used conventionally without particular limitation. Typical examples of the organic solvent include at least one selected from the group consisting of propylene carbonate, ethylene carbonate, diethyl carbonate, dimethyl carbonate, ethyl methyl carbonate, methyl propyl carbonate, dipropyl carbonate, dimethyl sulfoxide, acetonitrile, dimethoxyethane, diethoxyethane, vinylene carbonate, sulfolane, gamma-butyrolactone, propylene sulfite, and tetrahydrofuran.

Particularly, among the carbonate-based organic solvents, ethylene carbonate and propylene carbonate, which are cyclic carbonates, are organic solvents having high viscosity and a high dielectric constant, and thus may be used preferably, since they can dissociate the lithium salt in the electrolyte with ease. When such a cyclic carbonate is used after mixing it with a linear carbonate having low viscosity and a low dielectric constant, such as dimethyl carbonate or diethyl carbonate, it is possible to prepare an electrolyte having higher electrical conductivity, more preferably.

Optionally, the electrolyte used according to the present disclosure may further include additives contained in the conventional electrolyte, such as an overcharge-preventing agent, or the like.

The lithium secondary battery according to an embodiment of the present disclosure may be obtained by interposing the separator between the positive electrode and the negative electrode to form an electrode assembly, introducing the electrode assembly to a pouch, cylindrical battery casing or a prismatic battery casing, and then injecting the electrolyte thereto. In a variant, the lithium secondary battery may be obtained by stacking the electrode assemblies, impregnating the stack with the electrolyte, and introducing the resultant product to a battery casing, followed by sealing.

According to an embodiment of the present disclosure, the lithium secondary battery may be a stacked, wound, stacked and folded or cable type battery.

The lithium secondary battery according to the present disclosure may be used for a battery cell used as a power source for a compact device, and may be used preferably as a unit battery for a medium- or large-size battery module including a plurality of battery cells. Particular examples of such medium- or large-size devices include electric vehicles, hybrid electric vehicles, plug-in hybrid electric vehicles, power storage systems, or the like. Particularly, the lithium secondary battery may be useful for batteries for hybrid electric vehicles and new and renewable energy storage batteries, requiring high output.

Mode for Disclosure

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1: Manufacture of Electrode and Lithium Secondary Battery

<Manufacture of Positive Electrode>

Lithium iron phosphate oxide having a composition of LiFePO$_4$ (average particle diameter D50: 2 μm) as a first active material, carbon black as a conductive material and polyvinylidene fluoride (PVDF) as a first non-rubbery binder were added to N-methyl pyrrolidone (NMP) as a first dispersion medium at a weight ratio of 94:3:3 and were dispersed therein to prepare a slurry for a lower layer.

Lithium iron phosphate oxide having a composition of LiFePO$_4$ (D50: 1 μm) as a second active material, carbon black as a conductive material, polyvinylidene fluoride (PVDF) as a second non-rubbery binder and hydrogenated nitrile butadiene rubber (H-NBR) as a rubbery binder were added to N-methyl pyrrolidone (NMP) as a second dispersion medium at a weight ratio of 94:3:3:0.09 to prepare a slurry for an upper layer. In other words, the weight ratio of the second non-rubbery binder to the rubbery binder in the slurry for an upper layer was 1:0.03.

While the slurry for a lower layer was coated on one surface of aluminum (Al) foil (thickness: 10 μm) as a positive electrode current collector, the slurry for an upper layer was coated on the slurry for a lower layer at the same time, by using a double slot die. Herein, the loading amount of the slurry for a lower layer and that of the slurry for an upper layer were 300 mg/cm$^2$ and 300 mg/cm$^2$, respectively.

Then, the coated first slurry and the coated second slurry were dried at the same time by using a drying system provided with a hot air blower and an IR heater to form an active material layer.

Particularly, the drying chamber of the drying system has ten drying zones from the first drying zone, where the slurry-coated current collector is introduced to the drying system for the first time, to the tenth drying zone. From the first drying zone to the third drying zone, 8 hot air dryers are disposed and IR heaters are disposed between two adjacent hot air dryers, and thus total 8 IR heaters are provided. In addition, from the fourth drying zone to the sixth drying zone, the hot air flow of the hot air driers is controlled so that it may run from the top to the bottom. Further, from the seventh drying zone to the tenth drying zone, hot air dryers, in which hot air flow runs from the top to the bottom, and hot air dryers, in which hot air flow runs from the bottom to the top, are disposed alternately.

In the drying system, a stage was disposed on the bottom surface of the slurry-coated current collector (electrode sheet) to transport the slurry-coated current collector, wherein the slurry-coated current collector was transported at a rate of 50 m/min. The air-supplying fan for forming the flow of air supply from the outside of the drying system was operated at a rate of 1000 rpm, and the air-venting fan forming the flow of air vent from the inside of the drying chamber was operated at a rate of 1000 rpm. The temperature of the hot air dryers in each drying zone was as follows: 140° C. in the first drying zone, 130° C. in the second drying zone, 120° C. from the third to the eighth drying zones, 90° C. in the ninth drying zone, and 50° C. in the tenth drying zone.

Since the IR heaters installed in the first to the third drying zones emit near infrared rays having a wavelength of 0.7 μm, and the irradiation length of the IR heater is 30 cm per heater (the length of a lamp irradiating near IR rays from the IR heater is 30 cm), 24 IR heaters are disposed throughout the three drying zone at a constant interval (24 IR heaters were disposed in the three drying zones, 8 IR heaters per drying zone). Herein, only 3 IR heaters were used among the total 24 IR heaters, while maintaining a constant interval. In other words, the IR heaters were operated at an efficiency of 12.5% based on the efficiency obtained when using all of the IR heaters are used.

The thus formed upper and lower active material layers were pressed through roll pressing to obtain a positive electrode provided with an upper/lower bilayer structured active material layer having a loading amount of 16 mg/cm$^2$ per unit area after drying.

Herein, the lower layer had a thickness of 55 μm, the upper layer had a thickness of 55 μm, and the weight ratio of the lower layer region to the upper layer region was 1:1. The weight ratio of the second non-rubbery binder to the rubbery binder in the upper layer region was 1:0.03.

<Manufacture of Negative Electrode>

First, 30.0 parts by weight of natural graphite having an average sphericity of 0.95 and 63.8 parts by weight of artificial graphite having an average sphericity of 0.9, as negative electrode active materials, 1 parts by weight of carbon black as a conductive material, 3.7 parts by weight of styrene butadiene rubber (SBR) as a binder, and 1.5 parts by weight of carboxymethyl cellulose (CMC) as a binder also functioning as a thickener were mixed with water as a dispersion medium to prepare a slurry having a solid content of 46 wt %.

The slurry was coated on one surface of copper (Cu) foil (thickness: 10 μm) as a negative electrode current collector, and drying and pressing were carried out under the same conditions as the positive electrode to obtain a negative electrode. Herein, the loading amount was 11 mg/cm$^2$ based on the dry weight of the negative electrode active material layer, and the negative electrode had a thickness of 80 μm.

<Manufacture of Lithium Secondary Battery>

A non-aqueous electrolyte was prepared by dissolving LiPF$_6$ in an organic solvent containing ethylene carbonate (EC), propylene carbonate (PC) and diethyl carbonate (DEC) mixed at a volume ratio of 3:3:4 to a concentration of 1.0 M.

A porous polypropylene separator was interposed between the positive electrode and the negative electrode obtained as described above, and the electrolyte was injected thereto to obtain a lithium secondary battery.

Example 2: Manufacture of Positive Electrode and Lithium Secondary Battery

A positive electrode was obtained in the same manner as Example 1, except that lithium iron phosphate oxide having a composition of LiFePO$_4$ (average particle diameter D50: 1 μm) as a second active material, carbon black as a conductive material, polyvinylidene fluoride (PVDF) as a second non-rubbery binder and hydrogenated nitrile butadiene rubber (H-NBR) as a rubbery binder were added to N-methyl pyrrolidone (NMP) as a second dispersion medium at a weight ratio of 94:3:3:0.15 to prepare a slurry for an upper layer. Herein, the weight ratio of the second non-rubbery binder to the rubbery binder in the upper layer region of the positive electrode was 1:0.05.

A lithium secondary battery was obtained in the same manner as Example 1, except that the positive electrode obtained as described above was used.

Example 3: Manufacture of Positive Electrode and Lithium Secondary Battery

A positive electrode was obtained in the same manner as Example 1, except that lithium iron phosphate oxide having a composition of LiFePO$_4$ (average particle diameter D50: 1 μm) as a second active material, carbon black as a conductive material, polyvinylidene fluoride (PVDF) as a second non-rubbery binder and hydrogenated nitrile butadiene rubber (H-NBR) as a rubbery binder were added to N-methyl pyrrolidone (NMP) as a second dispersion medium at a weight ratio of 94:3:3:0.21 to prepare a slurry for an upper layer. Herein, the weight ratio of the second non-rubbery binder to the rubbery binder in the upper layer region of the positive electrode was 1:0.07.

A lithium secondary battery was obtained in the same manner as Example 1, except that the positive electrode obtained as described above was used.

Comparative Example 1: Manufacture of Positive Electrode and Lithium Secondary Battery A positive electrode was obtained in the same manner as Example 1, except that lithium iron phosphate oxide having a composition of LiFePO$_4$ (average particle diameter D50: 1 μm) as a second active material, carbon black as a conductive material, and polyvinylidene fluoride (PVDF) as a second non-rubbery binder were added to N-methyl pyrrolidone (NMP) as a second dispersion medium at a weight ratio of 94:3:3 to prepare a slurry for an upper layer. Herein, the weight ratio of the second non-rubbery binder to the rubbery binder in the upper layer region of the positive electrode was 1:0.

A lithium secondary battery was obtained in the same manner as Example 1, except that the positive electrode obtained as described above was used.

Comparative Example 2: Manufacture of Positive Electrode and Lithium Secondary Battery A positive electrode was obtained in the same manner as Example 1, except that lithium iron phosphate oxide having a composition of LiFePO$_4$ (average particle diameter D50: 1 μm) as a second active material, carbon black as a conductive material, polyvinylidene fluoride (PVDF) as a second non-rubbery binder, and hydrogenated nitrile butadiene rubber (H-NBR) as a rubbery binder were added to N-methyl pyrrolidone (NMP) as a second dispersion medium at a weight ratio of 94:3:3:0.03 to prepare a slurry for an upper layer. Herein, the weight ratio of the second non-rubbery binder to the rubbery binder in the upper layer region of the positive electrode was 1:0.01.

A lithium secondary battery was obtained in the same manner as Example 1, except that the positive electrode obtained as described above was used.

Comparative Example 3: Manufacture of Positive Electrode and Lithium Secondary Battery A positive electrode was tried to be obtained in the same manner as Example 1, except that lithium iron phosphate oxide having a composition of LiFePO$_4$ (average particle diameter D50: 1 μm) as a second active material, carbon black as a conductive material, polyvinylidene fluoride (PVDF) as a second non-rubbery binder, and hydrogenated nitrile butadiene rubber (H-NBR) as a rubbery binder were added to N-methyl pyrrolidone (NMP) as a second dispersion medium at a weight ratio of 94:3:3:0.3 to prepare a slurry for an upper layer. However, the slurry had excessively high viscosity to make it difficult to apply the slurry homogeneously onto the current collector. Therefore, it was not possible to obtain a positive electrode.

Herein, the weight ratio of the second non-rubbery binder to the rubbery binder in the upper layer region of the positive electrode was 1:0.1.

Comparative Example 4: Manufacture of Positive Electrode and Lithium Secondary Battery Lithium iron phosphate oxide having a composition of LiFePO$_4$ (average particle diameter D50: 2 μm) as a first active material, carbon black as a conductive material, polyvinylidene fluoride (PVDF) as a first non-rubbery binder, and hydrogenated nitrile butadiene rubber as a rubbery binder were added to N-methyl pyrrolidone (NMP) as a first dispersion medium at a weight ratio of 94:3:3:0.15 and were dispersed therein to prepare a slurry for a lower layer. In other words, the weight ratio of the first non-rubbery binder to the rubbery binder in the slurry for a lower layer was 1:0.05.

Lithium iron phosphate oxide having a composition of LiFePO$_4$ (D50: 1 μm) as a second active material, carbon black as a conductive material, polyvinylidene fluoride (PVDF) as a second non-rubbery binder and hydrogenated nitrile butadiene rubber (H-NBR) as a rubbery binder were added to N-methyl pyrrolidone (NMP) as a second dispersion medium at a weight ratio of 94:3:3:0.15 to prepare a slurry for an upper layer. In other words, the weight ratio of the second non-rubbery binder to the rubbery binder in the slurry for an upper layer was 1:0.05.

A lithium secondary battery was obtained in the same manner as Example 1, except that the slurry for a lower layer and the slurry for an upper layer prepared as described above were used to manufacture a positive electrode.

Comparative Example 5: Manufacture of Positive Electrode and Lithium Secondary Battery Lithium iron phosphate oxide having a composition of LiFePO$_4$ (average particle diameter D50: 2 μm) as a first active material, carbon black as a conductive material, polyvinylidene fluoride (PVDF) as a first non-rubbery binder, and hydrogenated nitrile butadiene rubber as a rubbery binder were added to N-methyl pyrrolidone (NMP) as a first dispersion medium at a weight ratio of 94:3:3:0.15 and were dispersed therein to prepare a slurry for a lower layer. In other words, the weight ratio of the first non-rubbery binder to the rubbery binder in the slurry for a lower layer was 1:0.05.

Lithium iron phosphate oxide having a composition of $LiFePO_4$ (D50: 1 µm) as a second active material, carbon black as a conductive material and polyvinylidene fluoride (PVDF) as a second non-rubbery binder were added to N-methyl pyrrolidone (NMP) as a second dispersion medium at a weight ratio of 94:3:3 to prepare a slurry for an upper layer. In other words, no hydrogenated nitrile butadiene rubber was added to the slurry for an upper layer.

A lithium secondary battery was obtained in the same manner as Example 1, except that the slurry for a lower layer and the slurry for an upper layer prepared as described above were used to manufacture a positive electrode.

Example 4: Manufacture of Positive Electrode and Lithium Secondary Battery

A positive electrode was obtained in the same manner as Example 1, except that lithium iron phosphate oxide having a composition of $LiFePO_4$ (D50: 1 µm) as a second active material, carbon black as a conductive material, polyvinylidene fluoride (PVDF) as a second non-rubbery binder and hydrogenated nitrile butadiene rubber (H-NBR) as a rubbery binder were added to N-methyl pyrrolidone (NMP) as a second dispersion medium at a weight ratio of 94:3:3:0.15 to prepare a slurry for an upper layer, and the thickness of the lower layer region was 37 µm, the thickness of the upper layer region was 73 µm, and the weight ratio of the lower layer region to the upper layer region was 1:2. Herein, the weight ratio of the second non-rubbery binder to the rubbery binder in the slurry for an upper layer of the positive electrode was 1:0.05.

A lithium secondary battery was obtained in the same manner as Example 1, except that the positive electrode obtained as described above was used.

Example 5: Manufacture of Positive Electrode and Lithium Secondary Battery

A positive electrode was obtained in the same manner as Example 1, except that lithium iron phosphate oxide having a composition of $LiFePO_4$ (D50: 1 µm) as a second active material, carbon black as a conductive material, polyvinylidene fluoride (PVDF) as a second non-rubbery binder and hydrogenated nitrile butadiene rubber (H-NBR) as a rubbery binder were added to N-methyl pyrrolidone (NMP) as a second dispersion medium at a weight ratio of 94:3:3:0.15 to prepare a slurry for an upper layer, and the thickness of the lower layer region was 18 µm, the thickness of the upper layer region was 92 µm, and the weight ratio of the lower layer region to the upper layer region was 1:5. Herein, the weight ratio of the second non-rubbery binder to the rubbery binder in the slurry for an upper layer of the positive electrode was 1:0.05.

A lithium secondary battery was obtained in the same manner as Example 1, except that the positive electrode obtained as described above was used.

Electrode Bending Test

Each of the positive electrodes according to Examples 1-5 and Comparative Examples 1-3 was cut into a size of width×length of 5 cm×10 cm to prepare a specimen.

A rod was surrounded with the prepared specimen to determine whether cracks were generated on the active material layer of the positive electrode or not. The test was carried out, while changing the diameter of the rod. The diameter of the rod in which cracks are generated on the active material layer is shown in the following Table 1. Herein, the cracks can be seen by observing a phenomenon of fine division in the active material layer.

A smaller rod diameter with which cracks are generated in the active material layer suggests that the electrode has higher flexibility.

TABLE 1

| | Bending test result of positive electrode Rod diameter with which cracks are generated in active material layer (unit: mm) |
|---|---|
| Example 1 | 5 |
| Example 2 | 4 |
| Example 3 | 3 |
| Example 4 | 3 |
| Example 5 | 2 |
| Comparative Example 1 | 6 |
| Comparative Example 2 | 6 |
| Comparative Example 3 | Positive electrode cannot be obtained. |

Referring to Table 1, in the case of Examples 1-5 satisfying a weight ratio of 1:0.03-1:0.07 of the second non-rubbery binder to the rubbery binder in the upper layer region according to the present disclosure, the rod diameter with which cracks are generated in the active material layer is smaller, suggesting that the electrodes show significantly improved flexibility.

Electrode Adhesion Test

Each of the positive electrodes according to Example 2 and Comparative Examples 4 and 5 was cut into a size of width×length of 20 mm×200 mm to prepare a specimen.

The specimen was fixed on slide glass in such a manner that the active material layer of the specimen might be in contact with the slide glass, and the force required for peeling the current collector from the active material layer was measured, while the current collector was peeled at a rate of 100 mm/min by using a UTM instrument (available from TA). The results are shown in the following Table 2. Herein, the peel force was measured at an angle of 90° between the slide glass and the electrode.

TABLE 2

| | Electrode adhesion (gf/20 mm) |
|---|---|
| Example 2 | 50 |
| Comparative Example 4 | 16 |
| Comparative Example 5 | 18 |

Referring to Table 2, the electrode of Example 2, which includes a rubbery binder in such a manner that the weight ratio of the second non-rubbery binder to the rubbery binder in the upper layer region may satisfy 1:0.03-1:0.07, and includes no rubbery binder in the lower layer region according to an embodiment of the present disclosure, shows significantly improved electrode adhesion. Particularly, it can be seen that Comparative Examples 4 and 5 including a rubbery binder in the lower layer region show significantly low electrode adhesion.

What is claimed is:

1. An electrode comprising:
   a current collector; and
   an electrode active material layer disposed on at least one surface of the current collector,
   wherein the electrode active material layer comprises:
      a lower layer region facing the current collector, and
      an upper layer region facing the lower layer region and extended to a surface of the electrode active material layer,
   the lower layer region comprises a first active material and a first non-rubbery binder, and is free from a rubbery binder,
   the upper layer region comprises a second active material, a second non-rubbery binder, and the rubbery binder,
   the rubbery binder is a hydrogenated nitrile butadiene rubber (H-NBR),
   each of the first non-rubbery binder and the second non-rubbery binder comprises a polyvinylidene fluoride (PVDF)-based polymer, and
   a weight ratio of the second non-rubbery binder to the rubbery binder in the upper layer region is 1:0.03 to 1:0.07.

2. The electrode according to claim 1, wherein a weight ratio of the lower layer region to the upper layer region is 1:1 to 1:5.

3. The electrode according to claim 1, wherein the electrode is a positive electrode, and each of the first active material and the second active material comprises a lithium iron phosphate (LFP) compound.

4. The electrode according to claim 3, wherein the lithium iron phosphate (LFP) compound has an average particle diameter (D50) of 0.8 μm to 2.5 μm.

5. The electrode according to claim 1, wherein the polyvinylidene fluoride (PVDF)-based polymer comprises polyvinylidene fluoride, polyvinylidene fluoride-co-hexafluoropropylene, polyvinylidene fluoride-co-chlorotrifluoroethylene, polyvinylidene fluoride-co-tetrafluoroethylene, polyvinylidene fluoride-co-trichloroethylene, or polyvinylidene fluoride-co-trifluoroethylene, or two or more of them.

6. The electrode according to claim 1, wherein the weight ratio of the second non-rubbery binder to the rubbery binder in the upper layer region is 1:0.04 to 1:0.06.

7. A method for manufacturing the electrode as defined in claim 1, comprising:
   preparing a slurry for a lower layer comprising the first active material, the first non-rubbery binder, and a first dispersion medium, and free from the rubbery binder, and preparing a slurry for an upper layer comprising the second active material, the second non-rubbery binder, the rubbery binder, and a second dispersion medium;
   coating the slurry for the lower layer on one surface of the current collector, and coating the slurry for the upper layer on the slurry for a lower layer, at the same time or after a predetermined time interval; and
   drying the coated slurry for the lower layer and the slurry for an upper layer at the same time to form an active material layer,
   wherein the rubbery binder is the hydrogenated nitrile butadiene rubber (H-NBR),
   each of the first non-rubbery binder and the second non-rubbery binder comprises the polyvinylidene fluoride (PVDF)-based polymer, and
   the weight ratio of the second non-rubbery binder to the rubbery binder in the slurry for an upper layer is 1:0.03 to 1:0.07.

8. The method for manufacturing the electrode according to claim 7, wherein the electrode is a positive electrode, and each of the first active material and the second active material comprises a lithium iron phosphate (LFP) compound.

9. The method for manufacturing the electrode according to claim 8, wherein the lithium iron phosphate (LFP) compound has an average particle diameter (D50) of 0.8 μm to 2.5 μm.

10. A lithium secondary battery comprising the electrode as defined in claim 1 as at least one of a positive electrode and a negative electrode.

11. A method for manufacturing the electrode as defined in claim 1, comprising:
    coating a slurry for a lower layer comprising the first active material, the first non-rubbery binder, and a first dispersion medium, and free from the rubbery binder on one surface of the current collector, followed by drying, to form a lower active material layer; and
    coating a slurry for an upper layer comprising the second active material, the second non-rubbery binder, the rubbery binder, and a second dispersion medium on a top surface of the lower active material layer, followed by drying, to form an upper active material layer,
    wherein the rubbery binder is the hydrogenated nitrile butadiene rubber (H-NBR),
    each of the first non-rubbery binder and the second non-rubbery binder comprises the polyvinylidene fluoride (PVDF)-based polymer, and
    the weight ratio of the second non-rubbery binder to the rubbery binder in the slurry for an upper layer is 1:0.03 to 1:0.07.

12. The method for manufacturing the electrode according to claim 11, wherein the electrode is a positive electrode, and each of the first active material and the second active material comprises a lithium iron phosphate (LFP) compound.

13. The method for manufacturing the electrode according to claim 12, wherein the lithium iron phosphate (LFP) compound has an average particle diameter (D50) of 0.8 μm to 2.5 μm.

* * * * *